Oct. 4, 1927. 1,644,330
W. G. EXTON
APPARATUS FOR MEASURING FLUIDS FOR TURBIDITY,
COLOR, AND OTHER CHARACTERISTICS
Filed June 11, 1923 3 Sheets-Sheet 1
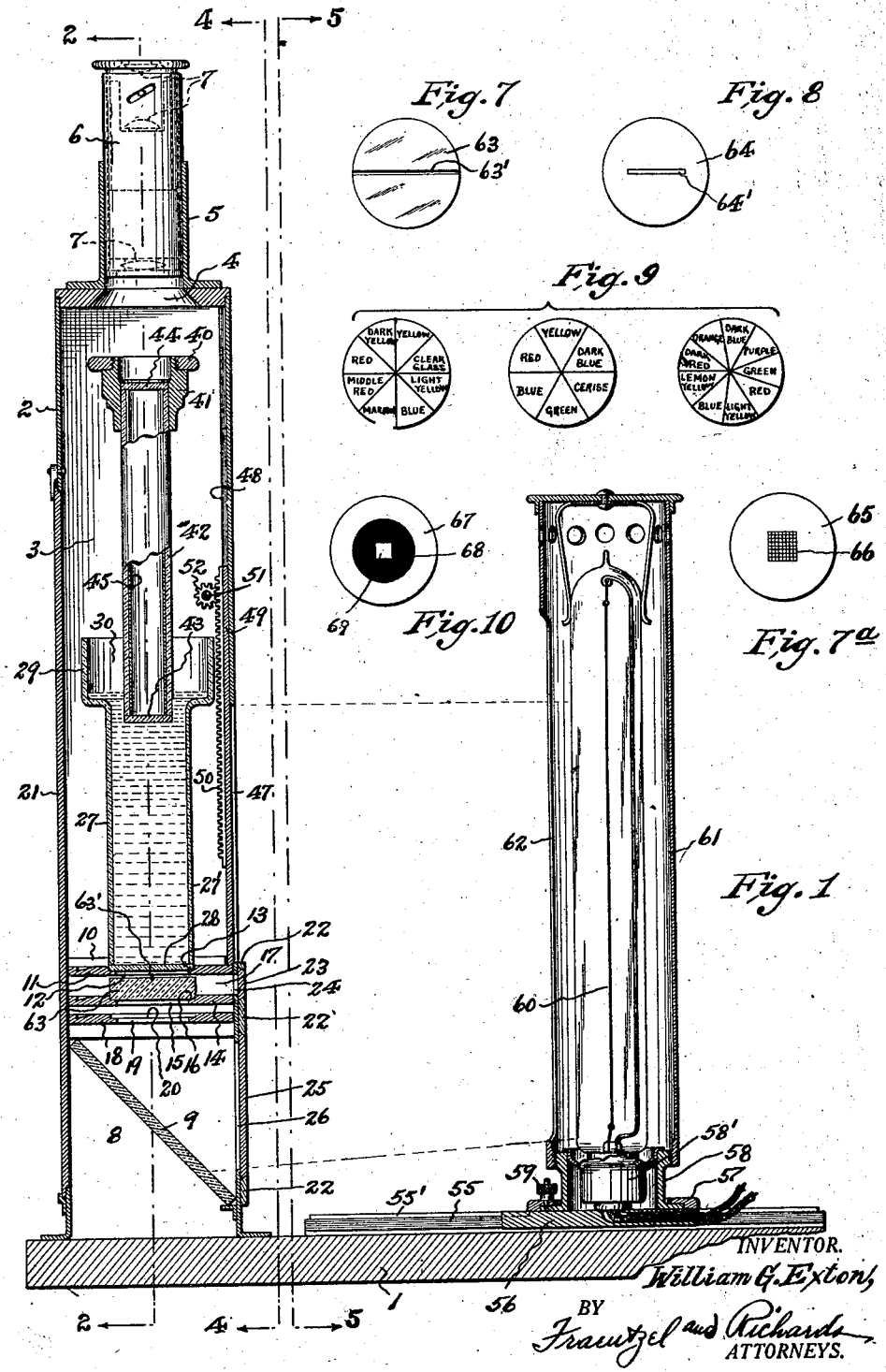
INVENTOR.
William G. Exton,
BY
Frautzel and Richards
ATTORNEYS.

Oct. 4, 1927.  
W. G. EXTON  
APPARATUS FOR MEASURING FLUIDS FOR TURBIDITY,  
COLOR, AND OTHER CHARACTERISTICS  
Filed June 11, 1923
1,644,330
3 Sheets-Sheet 2
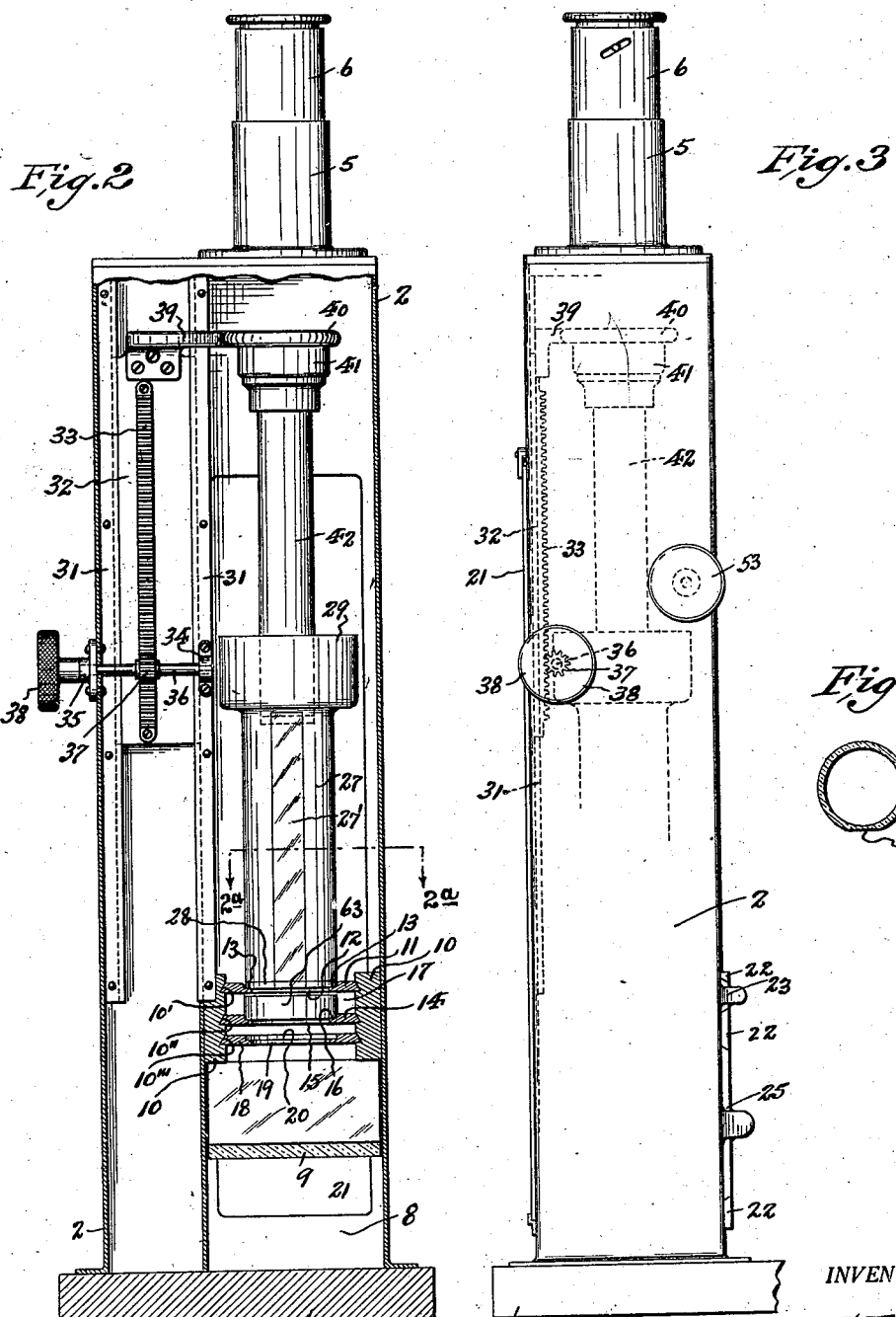
INVENTOR.  
BY William G. Exton,  
Frantzel and Richards  
ATTORNEYS.

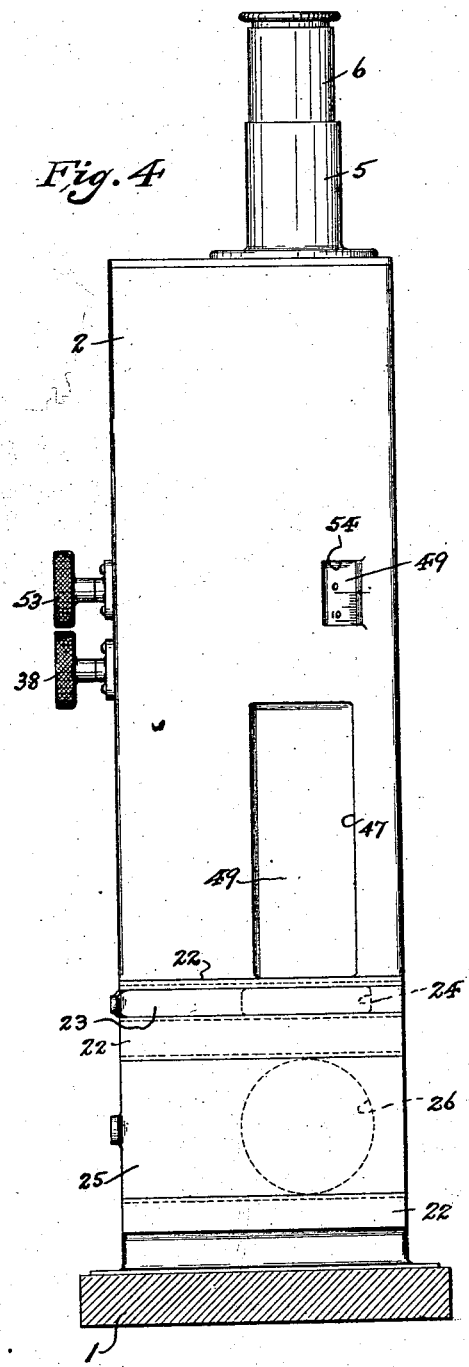
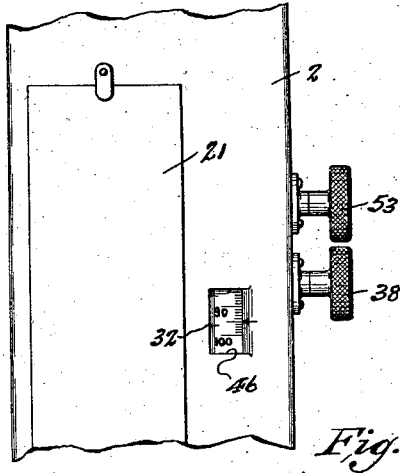
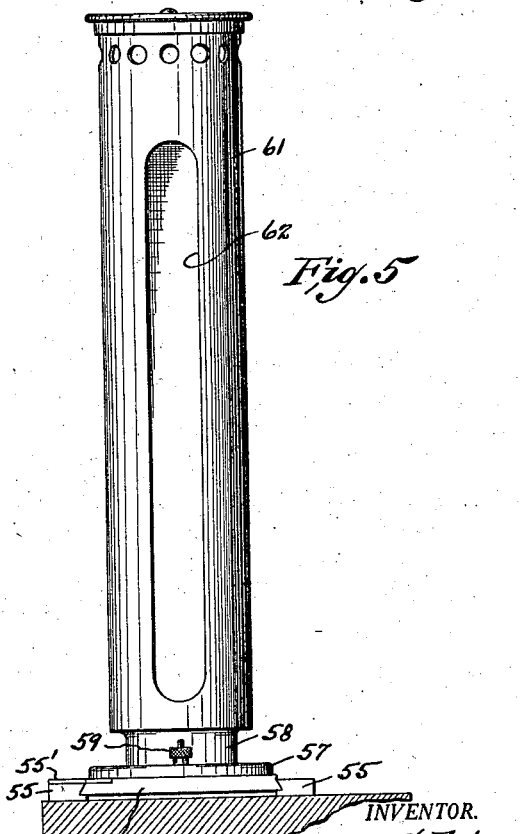

Patented Oct. 4, 1927.

1,644,330

UNITED STATES PATENT OFFICE.

WILLIAM G. EXTON, OF NEW YORK, N. Y.

APPARATUS FOR MEASURING FLUIDS FOR TURBIDITY, COLOR, AND OTHER CHARACTERISTICS.

Application filed June 11, 1923. Serial No. 644,602.

This invention relates, generally, to a novel apparatus or instrument for measuring turbidities, colors and other characteristics of fluids by optical observation.

The invention has for its principal object to provide a novel construction of optical instrument adapted to permit direct readings of fluids for cloudiness, color and other characteristics without necessity for using standards for comparison; the said instrument being adapted to operate either by transmitted light, that is by light transmitted through the fluid examined, or by reflected light, that is light reflected from substances suspended in the fluid which give rise to its turbidity, it being substantially agreed by investigators of the physics of turbidity, that denser solutions are better measured by transmitted light, while solutions of slight concentration are better measured by reflected light.

To this end, therefore, the novel instrument possesses a means for controlling the passage of light from a suitable target to an optical viewing device or eye-piece, and a means for interposing a comparatively small quantity of the fluid to be measured between said optical viewing device or eye-piece and the target. The light source and controlling means may be so manipulated or arranged as to illuminate the target by light transmitted from beneath the latter, or by an incidence grazing light entering the side and passing laterally through the target, or by light reflected upon the target from the substances suspended in the fluid. The instrument is further provided with means for varying the depth of the fluid to produce a predetermined visual effect or appearance of the target when viewed through the fluid and illuminated by either transmitted or incidence grazing light, which indicates the measuring point readable on a scale arranged to vary as the depth of the fluid varies. The instrument is also provided with means for varying the quantity of light reflected from the suspended substances in the fluid until a predetermined visual effect or appearance of the illuminated target, when viewed through the fluid, is obtained, which indicates the measuring point readable on a scale arranged to vary as the quantity of light varies. Various combinations of transmitted and reflected light, controlled as above mentioned, may be employed.

The invention has for a further object to provide an instrument of the kind described, in which the control of light from the source and through the instrument is such that interfering stray light and reflected light is reduced to a negligible minimum, so that the accuracy and dependibility of the readings obtained are assured.

Other objects of this invention, not at this time more particularly enumerated, will be clearly understood from the following detailed description of the same.

The invention is clearly illustrated in the accompanying drawings, in which:—

Figure 1 is a vertical longitudinal section of the novel instrument made according to and embodying the principles of this invention; Figure 2 is a transverse vertical longitudinal section, taken on line 2—2 in Figure 1; Figure 2$^a$ is a horizontal section through the fluid cup, taken on line 2$^a$—2$^a$ in Figure 2; Figure 3 is a side elevation of a portion of the instrument; Figure 4 is a transverse section, taken on line 4—4 in Figure 1; Figure 5 is another transverse section, taken on line 5—5 in Figure 1; and Figure 6 is a fragmentary front elevation of a portion of the instrument. Figure 7 is a face or plan view of a target used in measuring turbidities. Figure 7$^a$ is a face view of another form of target. Figure 8 is a face or plan view of a target also used in measuring turbidities. Figure 9 shows a series of analyzing targets used in measuring colors; and Figure 10 shows a determination target used in measuring colors.

Similar characters of reference are employed in all of the hereinabove described views, to indicate corresponding parts.

Referring now to said drawings, the reference character 1 indicates a base upon which is supported a casing or cabinet 2 providing an interior light-proof chamber 3. The top end wall of said casing or cabinet 2 is provided with an opening 4. Fixed upon said top end wall, so as to register over said opening 4, is a tubular barrel 5, in which is supported an optical viewing device or eye-piece consisting of a focusable lens-holder 6 having suitable lenses 7 adapted to produce a magnification of desired power.

The lower or bottom end of said casing or cabinet provides a reflector chamber 8 in which is situated a reflector member 9 disposed at the proper angle to reflect light upwardly through the main chamber 3 toward the optical viewing device or eye-piece. Fixed to the interior sides of said casing or cabinet 2, above said reflector member 9, are a pair of opposed transverse guide-blocks 10, see Figure 2, having upper guide-grooves 10', intermediate guide grooves 10", and lower guide-grooves 10'". Slidingly and removably supported by said upper guide-grooves 10' is a cup-supporting plate 11 having an opening 12 the marginal portions of which are formed to provide a cup-seat 13. Slidingly and removably supported by said intermediate guide grooves 10" is a target-supporting plate 14 having an opening 15 the marginal portions of which are formed to provide a target-seat 16. The space 17 intermediate said cup-supporting plate 11 and said target supporting plate 14 provides an incidence grazing light chamber, the purpose of which will be subsequently more fully set forth. Slidingly and removably supported by said lower guide grooves 10'" is an auxiliary supporting plate 18 having an opening 19 the marginal portions of which are formed to provide a seat 20 for auxiliary light filters or targets as occasion may require. Arranged in the front wall of the casing or cabinet 2 is a removable door 21, see Figure 6, which when open permits access to the main chamber 3, reflector chamber 8 and to the above-described supporting plates 11 14 and 18, whereby the latter may be withdrawn to place thereon or remove therefrom the various elements they are designed to support. The respective openings of the several supporting plates 11, 14 and 18 are all vertically alined with one another and with the optical viewing device or eye-piece, so that light reflected from the reflector member 9 will be transmitted therethrough and through the elements supported thereon to said optical viewing device or eye-piece.

Suitably secured upon the back of the casing or cabinet 2 in proper location are horizontal but vertically spaced apart guide-blocks 22 which are adapted to slidingly support a cover-slide 23 operating to close an opening 24 in the casing or cabinet wall which leads into the incidence grazing light chamber 17, and to slidingly support a second cover-slide 25 operating to close an opening 26 leading into said reflector chamber 8.

The reference character 27 indicates a fluid holding cup, preferably made of glass, the exterior side of which is ground to provide a longitudinal panel providing a plane surface 27' extending the full length of the cup. The lower end of said cup is closed by a transparent bottom member 28 made of optical glass. Connected with the upper open end of said cup is an annularly enlarged portion 29 which provides a basin 30 for receiving the overflow of fluid displaced from the cup when an optical plunger to be subsequently described is lowered into the same during the operation of the instrument. When normally placed within the instrument the cup 27 is supported by its lower end in the cup-seat 13 of the supporting plate 11, so that its transparent bottom is registered over the opening 12 of the latter. The main body of the cup below the basin 30 is preferably made of such dimensions that it will hold when full a column of fluid 100 millimeters in depth.

Mounted on the inner side of the front wall of the casing or cabinet 2 and off-set to one side of the doorway 21, are a pair of vertically disposed guideway strips 31 which slidingly support, for up and down movement, a slide-plate 32. Secured upon the slide-plate 32 is a longitudinal toothed rack 33. Journaled in bearings 34 and 35 is a spindle 36 which extends across said slide-plate and which is provided with a pinion 37 which operatively meshes with said rack 33. One end of said spindle 36 projects exteriorly from the side of the casing or cabinet, and is provided with a knob or finger-piece 38 for rotating said spindle and pinion to transmit through said rack either an upward or downward movement to said slide-plate, as may be desired. Secured to the upper end of said slide-plate is a laterally projecting bracket 39 having an internally threaded ring 40 at its free end in which is threaded the ferrule 41 to which is secured a downwardly projecting optical plunger, the latter being so positioned as to be axially alined between the cup 27 and the optical viewing device or eye-piece of the instrument. Said optical plunger may be made in various ways so that light will pass lengthwise therethrough. Preferably the same consists of a glass tube 42 closed at its bottom end by a bottom-piece 43 made of transparent optical glass, and preferably closed at its upper end by a cover-piece 44 also made of optical glass, and which prevents dust from entering and accumulating within the interior of the plunger. In order to prevent interfering light from being transmitted laterally across the plunger I provide the side walls thereof, preferably on the inside thereof, with a light-proof or opaque sheath 45. It will be apparent that when the slide-plate 32 is moved up or down, the plunger will also move correspondingly up and down relative to the cup 27, so that it may be entered into or retracted from the interior of the latter to vary the depth of the column of fluid exposed between the bottom of the cup and the bottom of the plunger. Preferably the slide-plate is arranged so as to be capable of a movement in excess of 100 millimeters, the zero position being that in which the optical plunger is in lowermost position engaging the bottom of the cup, thus permitting a reading or measuring of the depth of fluid between the bottom of the cup and the lower end of the plunger. To the end that such measurements may be quickly and easily read the slide-plate 32 is graduated to provide a 100 millimeter scale (see Figure 6) which is read through an opening 46 provided in the front wall of said casing or cabinet 2 over which the slide-plate and its scale moves, the reading being made with reference to a fixed mark etched at one marginal side of said opening 46. It will thus be apparent that the depth of the column of fluid intermediate the end of the plunger and the bottom of the fluid cup may be increased or decreased at will by raising or lowering the plunger, and that the scale will rise and fall proportionately to the plunger movement to alter the reading of the scale as the depth of fluid alters.

Provided in the rear wall of the casing or cabinet 2 is an opening 47 directly opposed to the cup 27 and corresponding in height to the height of the cup, that is, in the present case being 100 millimeters. The plane surfaced panel 27' of the cup faces this opening 47. Arranged upon the inside of the rear wall, and respectively disposed on either side of said opening 47 are guideway members 48 which slidingly support for up and down movement a shutter 49. Fixed on said shutter 49 is a longitudinal toothed rack 50. Journaled to extend across said shutter 49 is a spindle 51 which is provided with a pinion 52 to operatively mesh with said rack 50. One end of said spindle 51 projects exteriorly from the side of the casing or cabinet, and is provided with a knob or finger-piece 53 for rotating said spindle and pinion to transmit through said rack either an upward or downward movement to said door-slide, whereby the opening 47 may be closed or opened to the desired degree. In order to permit of the measurement of the amount of opening provided by a given adjustment of the shutter 49, the latter is graduated to provide a 100 millimeter scale (see Figure 4) which is read through an opening 54 provided in the wall of said casing or cabinet 2 over which the shutter 49 and its scale moves, the reading being made with reference to a fixed mark etched at one marginal side of said opening 54. The closed position of the shutter 49 establishes the zero mark or position of the scale.

Arranged upon said base 1, in the rear of said casing or cabinet 2, are slideway members 55 upon which is mounted a carriage plate 56 movable toward and away from said casing or cabinet 2. Fixed on said carriage-plate 56 is an annular bearing ring 57, and supported by said carriage-plate in connection with said bearing ring is a socket standard 58 which is rotatably adjustable on its vertical axis, but is capable of being fixed in adjusted position by a locknut means 59 cooperating with the same and said bearing ring. Said socket-standard 58 is provided with a suitable electric lamp socket 58' in which is connected an electric filament lamp 60 of special design. The longitudinal axis of said lamp 60, as thus mounted, and the axis through the optical viewing device, cup 27 and associated elements in the casing or cabinet 2 are parallel and alined in the same plane. By rotating the socket standard 58 the lamp-filament may be adjusted in position so as to be alined in the same plane. Suitably secured to the free end of said socket standard 58 is a lamp-hood 61 provided with a longitudinal slot or opening 62 which faces the casing or cabinet 2. The lamp 60 constitutes the light source of the instrument, and the same may be adjusted toward or away from the casing or cabinet 2 to secure the desired degree of light intensity and photometric adjustment of light relative to points where the light is permitted to enter the casing or cabinet. A scale 55' attached to a slideway member 55, with which the carriage-plate cooperates will permit a measurement of the amount of adjustment of the lamp relative to the casing or cabinet.

I will first briefly explain the functioning of the instrument when measuring a fluid of comparatively heavy turbidity. As above mentioned, for such fluids the instrument is preferably adjusted for the transmission of light directly through a target and then by way of the interposed column of fluid to the optical viewing device or eye-piece. Under such conditions the cover-slide 23 is closed to exclude light from the incidence grazing light chamber 17, and the shutter 49 is closed to exclude lateral light rays from the fluid-cup 27, while the cover-slide 25 is opened to permit light from the properly adjusted lamp 60 to fall upon the reflector member 9. The fluid to be measured is placed in the cup 27 and the optical plunger is racked down to the zero position in contact with the bottom of the cup. A suitable target is then placed beneath the cup, so that light will be reflected upwardly therethrough. A target as 63 (see Figure 7) may be employed which possesses a hair line 63' or other symbol etched upon its surface, or a target 64 (see Figure 8) may be employed which may consist of opaque silvered glass having a transparent line 64' or other symbol thereon, or any other desired character of target.

The operator now applies his eye to the optical viewing device or eye-piece, which has been focused, while the plunger is down to zero position, upon the line or symbol of the target so that a clear definition of the same is attained. The operator next racks the plunger up and down to adjust or vary the depth of fluid interposed between the same and the bottom of the cup 27 until such depth of the fluid is attained that the defined line or symbol of the target is obscured, that is until the point is reached at which the turbidity of the fluid intercepts the light rays passing through the target marks or symbols. This point establishes the reading point and the scale of the slide-plate 32 is read, and compared with a table of predetermined and established standard readings, so that the amount of turbidity possessed by the fluid under examination is directly obtained by such reading.

Certain characters of fluids may be better measured for turbidity by a variation of the above operation, and the method entailed therein. This variation consists in employing a transparent glass target of substantial thickness having on its upper surface an etched line or other symbol. Such a target is shown in Figures 1, 2 and 7 of the drawings. When using this target, light may be excluded from the reflector member 9 by closing the cover-slide 25, but admitted to the chamber 17 by opening the cover-slide 23. The light thereupon traverses the target laterally and at right angles to the axis of view through the instrument. The target field will therefore remain dark except where the light grazes the incidence of the etched line or symbol on the surface of the target, thereby causing a reflection therefrom which renders the line or symbol bright or luminous against the dark field of the main target surface. The plunger is racked up and down until the light of the luminous line or symbol is obscured or intercepted by the depth of fluid interposed, thus establishing a reading point much in the same manner as already above described.

A variation of the optical method involved in the use of my novel instrument, and adapted to the examination of fluids through a wide range of turbidity, consists in employing either incidence grazing light or transmitted light directed upon the target in conjunction or combination with light reflected from the particles in suspension in the fluid; under such circumstances the fluid in the cup being illuminated by laterally traversing light, in the nature of a Tyndall beam, which is admitted to the cup chamber 3 by opening the shutter 49 so that light from the lamp 60 may strike through the plane surface 27' of the cup and illuminate the particles in suspension in the fluid content thereof. In practicing this method the plunger 42 is racked down to zero position in contact with the bottom of the cup and the eye-piece is focused on the target which is illuminated by transmitted light from the reflector member 9 or by incidence grazing light admitted to the target chamber 17. The shutter 49 is fully opened. The turbid fluid to be measured is now poured into the cup. The plunger is then racked up admitting the Tyndall beam through the cloudy fluid until the amount of light reflected from the particles in suspension in the fluid matches the illumination of the target or obscures the target illuminated by incidence grazing light, thus producing practically a photometric match. When such condition is established, the reading point on the plunger slide scale is reached. In some cases the above method may be varied by placing the plunger at a predetermined position to establish a predetermined depth of fluid in the cup, thereupon admitting a varying quantity of light by raising or lowering the shutter 49 until the visual effect upon the target is obtained, the reading then being made on the shutter scale.

For exceedingly fine turbidities another method involves the use of a high powered eye-piece of increased magnification, so adjusted as to resolve the very fine ruling 66 of a transparent target 65 such as shown in Figure 7$^a$. In order to avoid difficulties connected with focusing with increased magnifications, the plunger 42 is set at the 100 millimeter mark and the eye-piece is then focused on the target, and then the Tyndall beam is regulated by raising and lowering the shutter 49, until the amount of light reflected by the particles in suspension in the fluid obscures the target marks, the reading being based on the amount of light required as indicated by the amount of shutter opening shown on the shutter scale.

My novel instrument is also adapted to serve in procuring direct readings of colors, or in other words to obtain colorimetric measurements. For such work I may use a system of light filters in place of the targets used for turbidimetry, the particular filter employed in a given case being of a color complementary to the color of the fluid examined, the plunger being racked or adjusted until all light is excluded from the eye-piece except that which is absorbed by the color of the fluid under examination. In practicing this method I make use of one of a series of analyzing targets, such as shown in Figure 9, which possesses a plurality of sectors providing a variety of light filters permitting different transmissions. These analyzing targets are viewed through the fluid under examination to ascertain which filter provides the proper complementary color filter for that particular fluid. This fact being ascertained, a determination filter is then substituted in the instrument for the analyzing filter. This determination filter is shown in Figure 10 and consists of a clear glass body 67 having a dead black and opaque center field 68 which surrounds a central filter panel 69 of the complementary color shown to be necessary or desirable by the analyzing filter. This determination filter is illuminated by transmitted light from the reflector member 9, the cover-slide 23 and shutter 49 being closed to exclude all other light from the interior of the casing or cabinet. The plunger is now racked up and down until a point is reached where the depth of fluid examined absorbs or intercepts all light passing through the filter panel of the determination target, so that said panel matches the black or light excluding field of the latter, thus establishing the reading point on the plunger scale.

The marginal clear glass field of the target permits a continued light transmission through the fluid under examination, so that the absorption of light passing through the filter panel is not at all dependent at any stage upon the threshold of vision.

I am aware that some changes may be made in the several arrangements and combinations of the devices and parts, as well as in the details of the construction of the same, without departing from the scope of this invention as set forth in the foregoing specification, and as defined in the appended claims. Hence, I do not limit my invention to the exact arrangements and combinations of the various devices and parts as described in said specification, nor do I confine myself to the exact details of the construction of said parts as illustrated in the accompanying drawings.

I claim:—

1. An instrument of the kind described, comprising a light-proof cabinet having a viewing aperture at its upper end; a fluid cup having a transparent bottom vertically alined beneath said aperture; a testing element alined beneath said fluid cup; a source of illumination mounted exteriorly of said cabinet; selective means connected with said cabinet operatable singly or in combination for controlling the admission thereinto of light from said light source to illuminate the testing element from beneath or laterally by incidence grazing light, and to illuminate the content of said fluid cup by a Tyndall beam, and means for varying and measuring the depth of the content of said fluid cup.

2. An instrument of the kind described, comprising a light-proof cabinet; a focusable optical viewing device connected with the upper end of said cabinet; a fluid cup having a transparent bottom vertically alined beneath said optical viewing device; a testing element alined beneath said fluid cup; a source of illumination mounted exteriorly of said cabinet; selective means connected with said cabinet operatable singly or in combination for controlling the admission thereinto of light from said light source to illuminate the testing element from beneath or laterally by incidence grazing light, and to illuminate the content of said fluid cup by a Tyndall beam; and means for varying and measuring the depth of the content of said fluid cup.

3. An instrument of the kind described, comprising a light-proof cabinet, a focusable optical viewing device connected with the upper end of said cabinet; a fluid cup having a transparent bottom vertically alined beneath said optical viewing device; a testing element alined beneath said fluid cup; a source of illumination mounted exteriorly of said cabinet; selective means connected with said cabinet operatable singly or in combination for controlling the admission thereinto of light from said light source to illuminate the testing element from beneath or laterally by incidence grazing light, and to illuminate the content of said fluid cup by a Tyndall beam; an optical plunger vertically movable between said optical viewing device and said fluid cup; means for actuating said plunger to vary the depth of fluid in said fluid cup; and means cooperating with said plunger actuating means for measuring the depth of fluid intermediate the bottom of said fluid cup and said plunger.

4. An instrument of the kind described, comprising a light-proof cabinet; a focusable optical viewing device connected with the upper end of said cabinet; a fluid cup having a transparent bottom; means for supporting said fluid cup in vertical alinement beneath said optical viewing device; a testing element or target; means for supporting said testing element or target in vertical alinement beneath said fluid cup; a reflector member beneath said testing element or target; a light source exteriorly disposed relative to said cabinet; means for adjusting said light source relative to said cabinet; said cabinet having an opening intermediate said light source and said reflector member; a cover-slide associated with said opening; said cabinet having a second opening intermediate said light source and said testing element or target adapted to admit incidence grazing light to the latter; a second cover-slide associated with said second opening; said cabinet having a third opening substantially corresponding in height to the height of said fluid cup and situated intermediate the latter and said light source; a shutter for said third opening; means for actuating said shutter; means cooperating with said shutter actuating means for measuring the amount of light admitted through said third opening; and means for varying and measuring the depth of the content of said fluid cup.

5. An instrument of the kind described, comprising a light-proof cabinet; a focusable optical viewing device connected with the upper end of said cabinet; a fluid cup having a transparent bottom; means for supporting said fluid cup in vertical alinement beneath said optical viewing device; a testing element or target in vertical alinement beneath said fluid cup; a reflector member beneath said testing element or target; a light source exteriorly disposed relative to said cabinet; means for adjusting said light source relative to said cabinet; said cabinet having an opening intermediate said light source and said reflector member; a coverslide associated with said opening; said cabinet having a second opening intermediate said light source and said testing element or target adapted to admit incidence grazing light to the latter; a second coverslide associated with said second opening; said cabinet having a third opening substantially corresponding in height to the height of said fluid cup and situated intermediate the latter and said light source; a shutter for said third opening; means for actuating said shutter; means cooperating with said shutter actuating means for measuring the amount of light admitted through said third opening; an optical plunger vertically movable between said optical viewing device and said fluid cup; means for actuating said plunger to vary the depth of fluid in said fluid cup; and means cooperating with said plunger actuating means for measuring the depth of fluid intermediate the bottom of said fluid cup and said plunger.

6. An instrument of the kind described, comprising a light-proof cabinet; a focusable optical viewing device connected with the upper end of said cabinet; a transparent fluid cup alined beneath said viewing device; means for varying and measuring the depth of the content of said fluid cup; a target; means for supporting said target in vertical alinement beneath said fluid cup; an external light source; a reflector member beneath said target; and said cabinet having an opening intermediate said light source and said reflector member provided with means for opening and closing the same.

7. An instrument of the kind described, comprising a light-proof cabinet; a focusable optical viewing device connected with the upper end of said cabinet; a transparent fluid cup aligned beneath said viewing device; means for varying and measuring the depth of the content of said fluid cup; a target; means for supporting said target in vertical alinement beneath said fluid cup; an external light source; a reflector member beneath said target; said cabinet having an opening intermediate said light source and said reflector member provided with means for opening and closing the same, and said cabinet having a light admission opening intermediate said fluid cup and said light source corresponding in length to the length of the former; and adjustable means for opening and closing said light admission opening having means for measuring the amount of adjusted opening.

8. An instrument of the kind described, comprising a light-proof cabinet; a focusable optical device connected with the upper end of said cabinet; a transparent fluid cup alined beneath said viewing device; means for varying and measuring the depth of the content of said fluid cup; a target; means for supporting said target in vertical alinement beneath said fluid cup; an external light source; said cabinet having an opening intermediate said target and said light source to permit incidence grazing light to illuminate said target; and means for opening and closing said opening.

9. An instrument of the kind described, comprising a light-proof cabinet; a focusable optical viewing device connected with the upper end of said cabinet; a transparent fluid cup alined beneath said viewing device; means for varying and measuring the depth of the content of said fluid cup; a target; means for supporting said target in vertical alinement beneath said fluid cup; an external light source; said cabinet having an opening intermediate said target and said light source to permit incidence grazing light to illuminate said target; means for opening and closing said opening; and said cabinet having a light admission opening intermediate said fluid cup and said light source corresponding in length to the length of the former; and adjustable means for opening and closing said light admission opening having means for measuring the amount of adjusted opening.

10. An instrument of the kind described, comprising a light-proof cabinet, a transparent fluid cup in said cabinet, a transparent plunger movable into said cup, actuating means for raising and lowering said plunger to vary the depth of the content of said fluid cup, means cooperating with said plunger actuating means for indicating the adjusted depth of the content of said fluid cup, a target beneath said fluid cup, a light source, means for admitting light to said target to illuminate the same, and means for admitting light in the form of a Tyndall beam to traverse said fluid cup and its content.

11. An instrument of the kind described, comprising a light-proof cabinet, a transparent fluid cup in said cabinet, a transparent plunger movable into said cup, actuating means for raising and lowering said plunger to vary the depth of the content of said fluid cup, means cooperating with said plunger actuating means for indicating the adjusted depth of the content of said fluid cup, a target beneath said fluid cup, said target comprising an opaque body within the field of which is etched a light transmitting target mark, and means for illuminating said target.

12. An instrument of the kind described, comprising a light-proof cabinet, a transparent fluid cup in said cabinet, a transparent plunger movable into said cup, actuating means for raising and lowering said plunger to vary the depth of the content of said fluid cup, means cooperating with said plunger actuating means for indicating the adjusted depth of the content of said fluid cup, a target beneath said fluid cup, means for illuminating said target, and means for illuminating the content of said fluid cup by a laterally traversing or Tyndall beam.

In testimony, that I claim the invention set forth above I have hereunto set my hand this 7th day of June, 1923.

WILLIAM G. EXTON.